US012754439B2

(12) United States Patent
Joseph et al.

(10) Patent No.: US 12,754,439 B2
(45) Date of Patent: Oct. 6, 2026

(54) SELECTIVE VISUALIZATION OF AN IMAGE USING SECOND PASS-THROUGH OF POLARIZED LIGHT

(71) Applicant: DISNEY ENTERPRISES, INC., Burbank, CA (US)

(72) Inventors: Daniel Mark Joseph, Windermere, FL (US); Jessica Anne Klouda, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 216 days.

(21) Appl. No.: 18/770,753

(22) Filed: Jul. 12, 2024

(65) Prior Publication Data

US 2026/0016699 A1 Jan. 15, 2026

(51) Int. Cl.
*G02B 27/01* (2006.01)
*G02B 27/02* (2006.01)
(Continued)

(52) U.S. Cl.
CPC ......... *G02B 27/021* (2013.01); *G02B 27/022* (2013.01); *G02B 27/024* (2013.01); *G02B 27/28* (2013.01); *G02B 27/283* (2013.01); *G09F 13/04* (2013.01); *G09F 13/06* (2013.01); *G09F 19/12* (2013.01); *G02B 27/0101* (2013.01); *G03B 21/26* (2013.01); *G03B 21/604* (2013.01); *G03B 35/26* (2013.01); *G09F 13/42* (2013.01)

(58) Field of Classification Search
CPC .............. G02B 27/0101; G02B 27/021; G02B 27/022; G02B 27/024; G02B 27/28; G02B 27/283; G03B 21/26; G03B 21/604; G03B 35/26; G09F 13/04; G09F 13/0404; G09F 13/06; G09F 13/08; G09F 13/10; G09F 13/12; G09F 13/20; G09F 13/22; G09F 2013/222; G09F 2013/225; G09F 2013/227
See application file for complete search history.

(56) References Cited

U.S. PATENT DOCUMENTS 6,301,044 B1 * 10/2001 Huber .................... G02B 30/25
348/E13.058
7,213,930 B2 5/2007 Quach
(Continued)

OTHER PUBLICATIONS

Smigla, Karina, "Modified Polarizers", https://blair-neal.gitbook.io/survey-of-alternative-displays/alternative-displays/modified-polarizers; Published 2023.

*Primary Examiner* — Ryan S Dunning
(74) *Attorney, Agent, or Firm* — Dorsey & Whitney LLP

(57) ABSTRACT

A system may include a first polarizer to create polarized light having a polarization, a substrate that maintains the polarization and allows a first pass-through of the polarized light, and a graphic layer that maintains the polarization and allows a second pass-through of the polarized light, the graphic layer including a first image. The system may include a second polarizer separate from the substrate and the graphic layer and configured to enable a visualization of a second image different than the first image. The graphic layer may include perforations to allow the second pass-through of the polarized light. The first polarizer and substrate may be embodied in a display. The graphic layer may be placed on the display, such as on the substrate.

18 Claims, 3 Drawing Sheets

(51) Int. Cl.

| | |
|---|---|
| ***G02B 27/28*** | (2006.01) |
| ***G03B 21/26*** | (2006.01) |
| ***G03B 21/604*** | (2014.01) |
| ***G03B 35/26*** | (2021.01) |
| ***G09F 13/04*** | (2006.01) |
| ***G09F 13/06*** | (2006.01) |
| ***G09F 13/42*** | (2006.01) |
| ***G09F 19/12*** | (2006.01) |

(56) References Cited

U.S. PATENT DOCUMENTS

| | | | |
|---|---|---|---|
| 8,624,960 | B2 | 1/2014 | Unkel et al. |
| 9,568,766 | B2 | 2/2017 | Li et al. |
| 10,719,134 | B2 | 7/2020 | Aman |
| 10,861,267 | B2 | 12/2020 | Aman |
| 10,974,135 | B2 | 4/2021 | Aman et al. |
| 11,025,892 | B1 | 6/2021 | Aman et al. |
| 11,224,796 | B1 | 1/2022 | Aman et al. |

* cited by examiner

SELECTIVE VISUALIZATION OF AN IMAGE USING SECOND PASS-THROUGH OF POLARIZED LIGHT

FIELD

The present application relates to a display system, such as a system to generate selectively invisible imagery.

BACKGROUND

Signage (e.g., within amusement parks, on cruise ships, etc.) is generally printed or includes a backlit graphic. In some cases, digital displays are used, such as to display different images or videos, as desired. In general, these signs and graphics are informational and only have one read.

BRIEF SUMMARY

In one example, a system includes a first polarizer configured to create polarized light having a polarization, a substrate configured to maintain the polarization and allow a first pass-through of the polarized light, a graphic layer configured to maintain the polarization and allow a second pass-through of the polarized light, the graphic layer comprising a first image, and a second polarizer separate from the substrate and the graphic layer, the second polarizer configured to enable a visualization of a second image from the polarized light.

Optionally, openings are defined in the first image to allow the second pass-through of the polarized light. The graphic layer may include perforations that define the openings of the first image.

Optionally, the graphic layer is placed on the substrate. The system may include a display, wherein the display includes the first polarizer and the substrate. The display may backlight the graphic layer to highlight the first image.

Optionally, the second image is different than the first image.

In another example, a system includes a first polarizer configured to create polarized light having a polarization, a substrate configured to maintain the polarization and allow a first pass-through of the polarized light, a graphic layer including perforations to allow a second pass-through of the polarized light, the graphic layer comprising a first image, and a second polarizer separate from the substrate and the graphic layer, the second polarizer configured to enable a visualization of a second image from the polarized light.

Optionally, the graphic layer is configured to maintain the polarization.

Optionally, the system includes a display, wherein the display comprises the first polarizer and the substrate. The graphic layer may be a graphic on the display. The display may be a liquid crystal display. The second image may be a video.

Optionally, the first image is a static image, and the second image is a dynamic image.

In another example, a system includes a display including a first polarizer configured to create polarized light having a polarization, and a substrate configured to maintain the polarization and allow a first pass-through of the polarized light. The system includes a graphic layer on the substrate and including a first image, the graphic layer configured to maintain the polarization and including perforations to allow a second pass-through of the polarized light. The system includes a second polarizer separate from the display and the graphic layer, the second polarizer configured to enable a visualization of a second image from the polarized light.

Optionally, the graphic layer is a graphic adhered to the substrate on a front of the display.

Optionally, the second polarizer is matched to an orientation of the display to enable the visualization of the second image.

Optionally, the substrate is annealed glass or cast acrylic.

Optionally, the graphic layer is opaque to obfuscate the display.

Optionally, the graphic layer includes at least 40 percent perforations.

In addition to the exemplary aspects and embodiments described above, further aspects and embodiments will become apparent by reference to the drawings and by study of the following description.

DETAILED DESCRIPTION

Signage (e.g., within amusement parks or an attraction, or on cruise ships) is generally printed or a backlit graphic. In some cases, a digital display, such as a liquid crystal display (LCD), is used to display the graphic, allowing the graphic to be changed out or change. For the most part, these signs and graphics are informational and have only one read, meaning that all guests see the signs and graphics in the same way.

In examples, a system utilizes the same infrastructure and first read graphics to allow guests (e.g., those with a special lens or filter) to see a hidden photo or video message. For example, a system may utilize standard signage (e.g., themed signage in cruise ships or amusement parks) that can house other information viewable only with special equipment. From the average guest's point of view (POV), the system may display a regular sign or graphic (e.g., a menu with printed items, a map, a directory, artwork, etc.). Using special equipment (e.g., a decoder lens, special glasses, or a filter), a separate image that is otherwise invisible may be viewable.

For instance, a hidden image of a special menu item offering may appear when looking at an otherwise normal menu (e.g., with a decoder lens), with everyone without the decoder lens seeing the normal menu items only, making for a fun interaction. The system can also allow for signage to be printed in one language, but the same signage can appear in a different language when using a special lens. In yet another example, the average guest may see static artwork (e.g., of a particular movie or character), but the artwork may appear dynamic (e.g., a video image of the movie or character) using a special lens or filter. Such examples are illustrative only, with the system allowing one of two different images to be seen by a guest, depending on whether the guest is using special equipment, as described herein.

Figure 1:
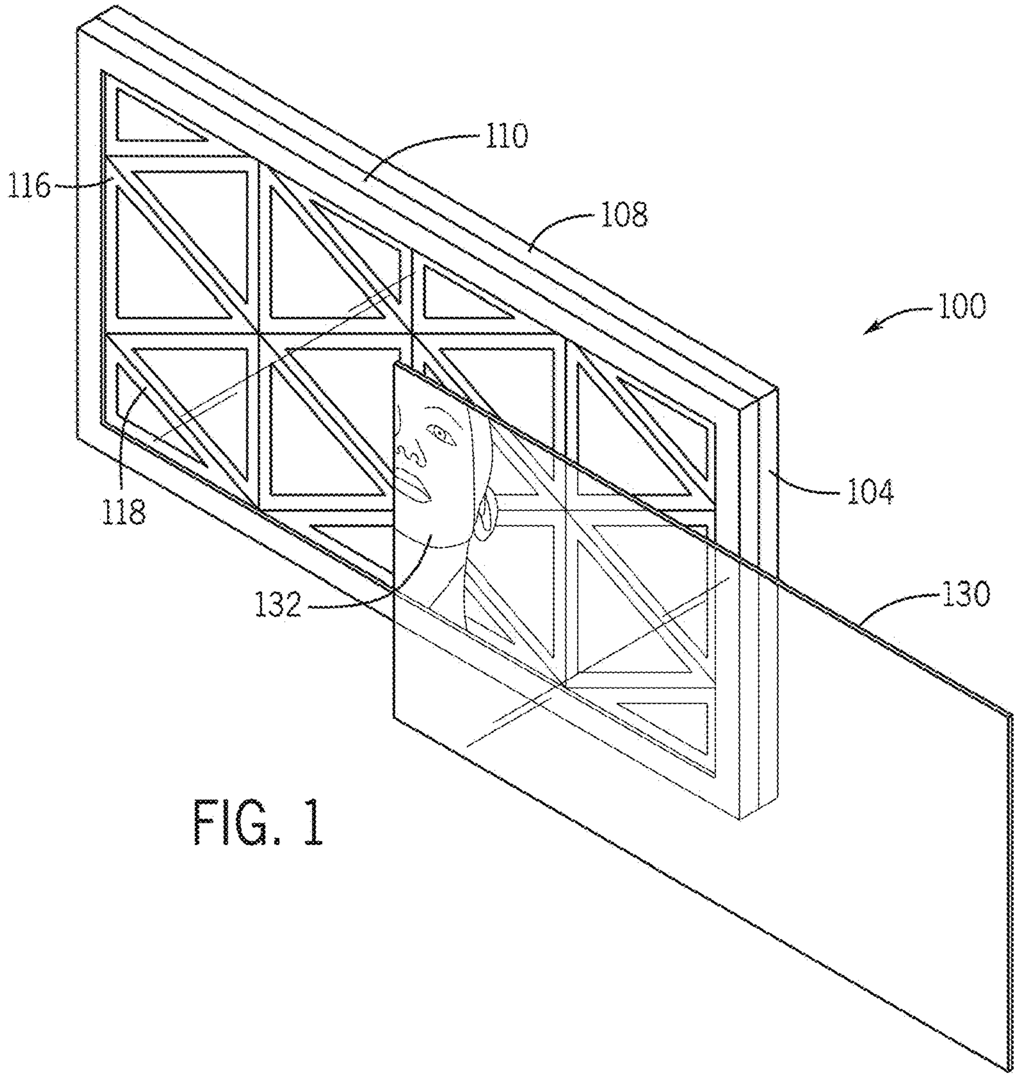
FIG. 1 illustrates an example image system.
Figure 2:
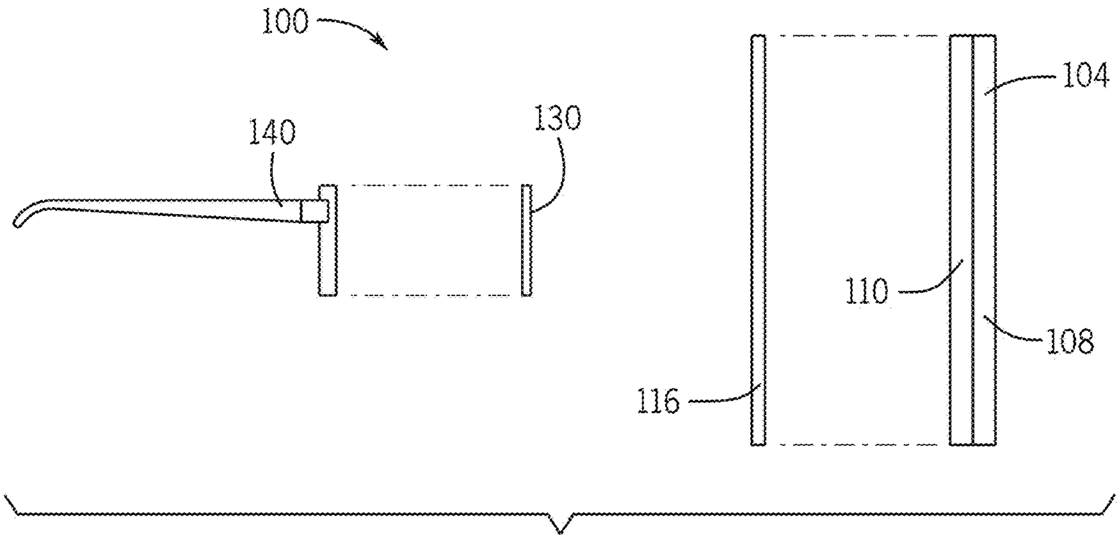
FIG. 2 illustrates a schematic exploded view of an example image system.

Along these lines, FIGS. 1-2 illustrate an example image system 100 providing selective viewability of a hidden image. The system 100 may include a display 104 (e.g., an LCD). The display 104 may include a first polarizer 108 and a substrate 110. The first polarizer 108 may be configured to create polarized light having a polarization. For example, unpolarized light from a backlight or light source (not shown), may be passed through the first polarizer 108 to filter the unpolarized light. The first polarizer 108 may be a linear polarizer to linearly polarize incoming light (e.g., white light) from the light source.

The substrate 110 may be configured to maintain the polarization and allow a first pass-through of the polarized light. For example, the filtered light (e.g., from the first polarizer 108) may pass through the substrate 110 without the substrate 110 affecting the light. In other words, the substrate 110 may maintain or otherwise retain the polarization created by the first polarizer 108. Depending on the application, the substrate 110 may be annealed glass or cast acrylic, although other materials are contemplated that retain or maintain polarization. In examples, the substrate 110 may include properties that enhance an image. For instance, the substrate 110 may be grey smoked or otherwise configured to enhance image characteristics.

In examples, the system 100 may include a graphic layer 116. The graphic layer 116 may be on the substrate 110 (e.g., placed on the substrate 110) and include a first image 118 (e.g., a tint, a graphic, a photo, etc.). In one example, the graphic layer 116 may be a graphic adhered (e.g., permanently or removably) to the substrate 110 on a front of the display 104. When removably configured, the graphic layer 116 may be removed from the display 104, such as to replace with a different graphic, allow maintenance of the display 104, or otherwise desired. In other examples, the substrate 110 may form the graphic layer 116. For instance, the graphic layer 116 may be etched or printed on the substrate 110. In such examples, the substrate may define an image surface having the first image 118.

The graphic layer 116 may be configured to hide or conceal the display 104, such as to make the display 104 or system 100 inconspicuous. For instance, the graphic layer 116 may be opaque or translucent, obfuscating the display 104 behind it. In such examples, the display 104 may backlight the graphic layer 116, such that the first image 118 is viewable (e.g., during day or night, outside in daylight, etc.), to highlight the first image 118, etc. In some examples, a front light (not shown) may rake or graze the front surface of the graphic layer 116, keeping the front of the graphic layer 116 (e.g., first image 118) visible.

Figure 3:
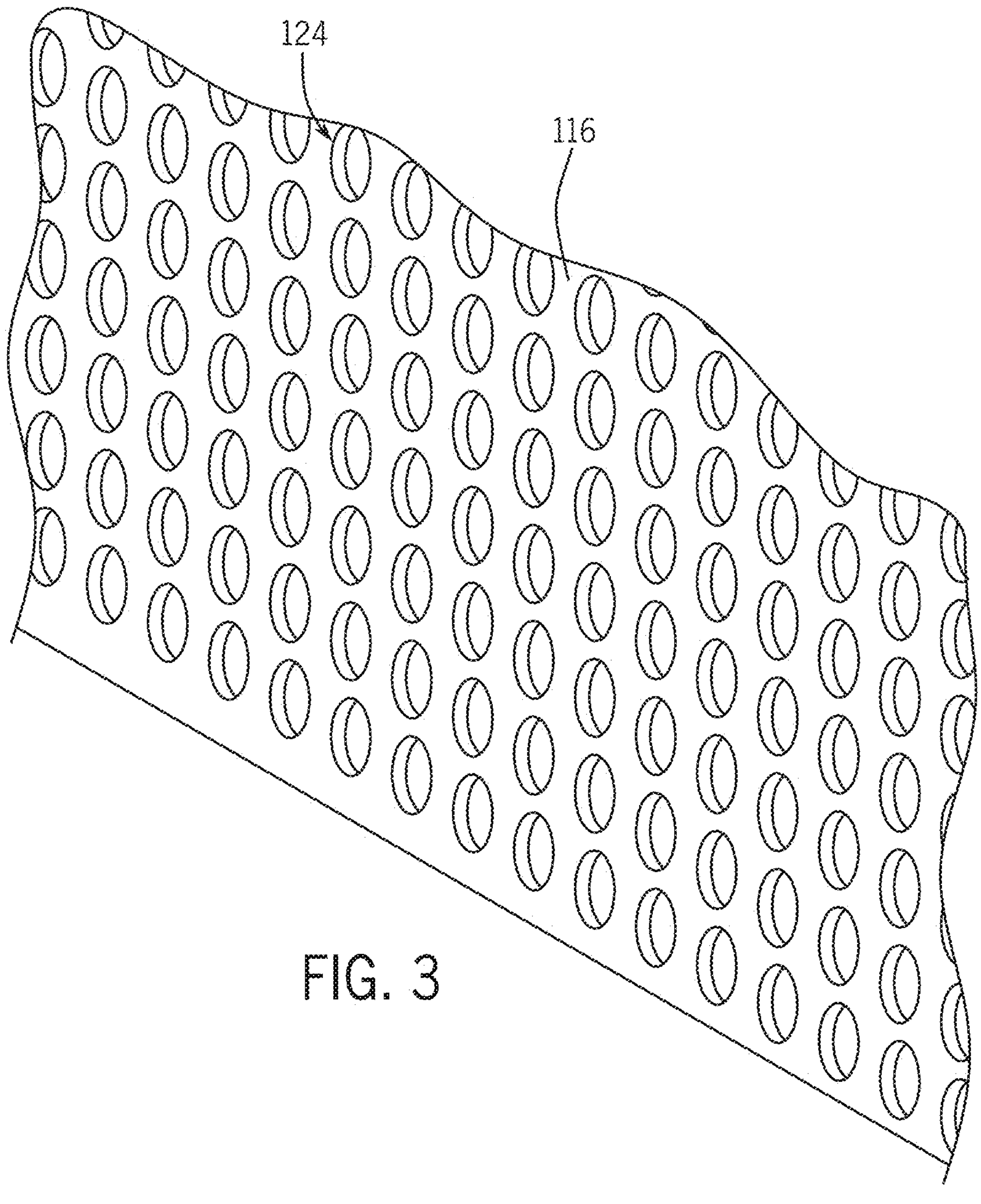
FIG. 3 illustrates a fragmentary view of an example graphic layer of an image system.

In examples, the graphic layer 116 may be configured to maintain the polarization. For instance, referring to FIG. 3, the graphic layer 116 may include perforations 124 (see FIG. 3) to allow a second pass-through of the polarized light. The perforations 124 may allow light to pass through from the display 104 without diffusing the polarized light. Depending on the application, the perforations 124 may be formed using holes, slots, or other openings defined through the graphic layer 116. In examples, the graphic layer 116 may include at least 40% perforations 124 (e.g., a 60/40 perforation rating, 40% open, etc.), although other configurations are contemplated. In examples, the graphic layer 116 may be perforated vinyl, perforated window film, a perforated decal, or the like.

Such examples are illustrative only, and other configurations are contemplated, including examples where the perforations or openings 124 are defined using other methods (e.g., printed, dot printing, etc.). For example, the graphic layer 116 may be clear acrylic with the first image 118 printed on the clear acrylic (e.g., a transparency print direct to the acrylic substrate), with the printing defining the perforations 124. In this manner, the first image 118 may have small (e.g., microscopic) perforations 124 to allow light to pass through from the display 104 (e.g., without diffusing the polarized light). As a result, the perforations 124 may be less visible compared to other implementations (e.g., perforated window vinyl). Such examples may also allow tint or darkness to be printed as part of the graphic or first image 118.

Referring to FIGS. 1-2, the system 100 may include a second polarizer 130. The second polarizer 130 may be separate from the display 104 (e.g., substrate 110) and the graphic layer 116. For instance, the second polarizer 130 may be spaced from the display 104 and the graphic layer 116. The second polarizer 130 may be configured to enable a visualization of a second image 132 from the polarized light. For example, the second polarizer 130 may further polarize the light created by the first polarizer 108 to enable a visualization of a second image 132 different than the first image 118. In examples, the first image 118 may be a static image, and the second image 132 may be a dynamic image (e.g., a video). In other examples, the first image 118 may be a first static image, and the second image 132 may be a second static image different than the first static image. In other examples, the first image 118 may be a first video, and the second image 132 may be a second video different than the first video.

The further polarization of the polarized light may generate the second image 132, such as when viewing the display 104 through the second polarizer 130. For example, the second image 132 may be viewable only after light passes through both the first polarizer 108 and the second polarizer 130; otherwise, only the first image 118 is viewable. In other words, both the first polarizer 108 and the second polarizer 130 are needed to complete the image creation of the second image 132.

In examples, the second polarizer 130 may be matched to an orientation of the display 104. For example, the display 104 may include a directionality. In such examples, the second polarizer 130 must be aligned with the directionality of the display 104 to enable the visualization of the second image 132. If the second polarizer 130 is not aligned, the second image 132 will not be visualized or will appear differently. This feature may be used to alter to change the visualization of the second image 132. For instance, having the display 104 and second polarizer 130 in a first relative orientation (e.g., display 104 in portrait mode, second polarizer 130 in a first orientation, etc.) may visualize the second image 132 with a first configuration (e.g., a positive configuration, a normal mode, etc.). Having the display 104 and second polarizer 130 in a different second relative orientation (e.g., display 104 in landscape mode, second polarizer 130 in a second orientation, etc.) may visualize the second image 132 with a second configuration (e.g., a negative configuration, a reverse mode, etc.). In such examples, the display 104 and/or second polarizer 130 may be rotated to alternate between configurations (e.g., to alternate colors between negative and positive, to selectively view second image 132, etc.).

Because the second polarizer 130 is separate from the display 104 and the graphic layer 116, the second image 132 is viewable only by a guest having the second polarizer 130. For instance, referring to FIG. 2, the second polarizer 130 may be embodied on a pair of glasses 140, such as the second polarizer 130 defining the lens of the glasses 140. In such examples, the second image 132 is viewable by a guest only after the guest dons the glasses 140. When the glasses 140 are removed, or if a different guest does not have the glasses 140, the second image 132 cannot be seen (e.g., the second image 132 is invisible) and only the first image 118 is viewable. Such examples are illustrative only, and the second polarizer 130 may be embodied differently, such that the second polarizer 130 is at the guest, separate from the display 104. For example, the second polarizer 130 may be embodied in other accessories to place in front of the guest's eyes (e.g., goggles, facemasks, handheld devices, etc.), at a guest device (e.g., as a filter placed in front of the guest's camera), or the like. As a result, the second image 132 may be viewable by the guest either directly (e.g., through glasses 140, etc.) or indirectly (e.g., via a filtered camera image).

Figure 4:
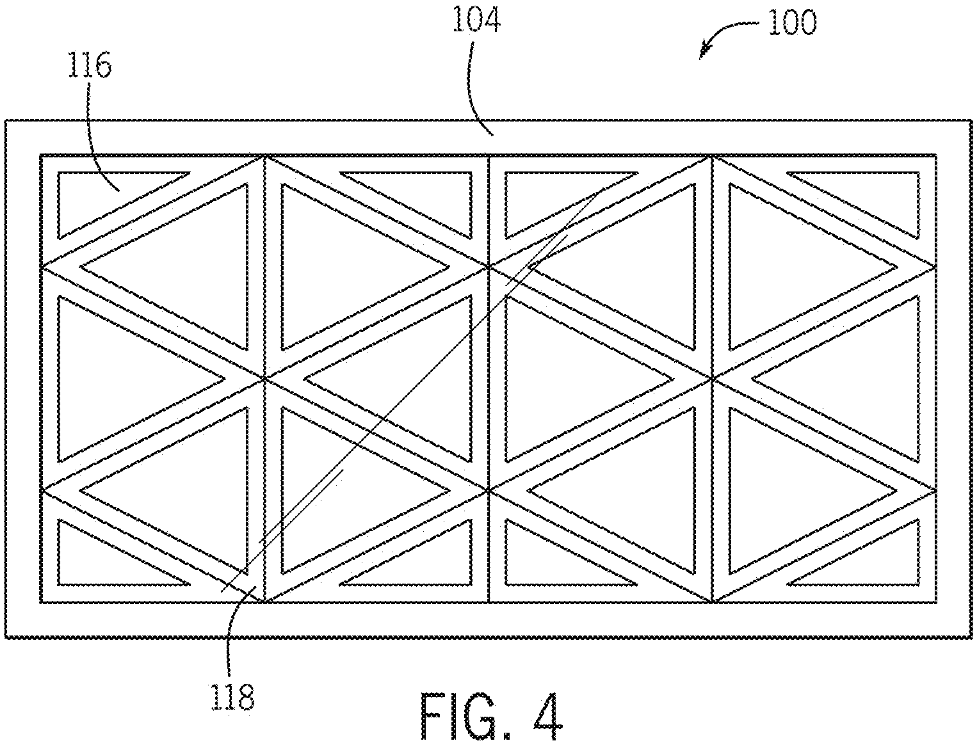
FIG. 4 illustrates a guest point-of-view (POV) of an image generated by an example image system in a first configuration.

FIG. 4 illustrates a guest POV of an image generated by the system 100 in a first configuration. In FIG. 4, the first configuration may include the display 104 and the graphic layer 116. For example, the graphic layer 116 may be placed on the display 104 (e.g., to conceal the display 104, such that the display 104 backlights the graphic layer 116, etc.). In such configurations, only the first image 118 is viewable by a guest. For example, without the second polarizer 130, guest's walking by or viewing the system 100 may see the first image 118 only (e.g., a piece of artwork, a menu, etc.).

Figure 5:
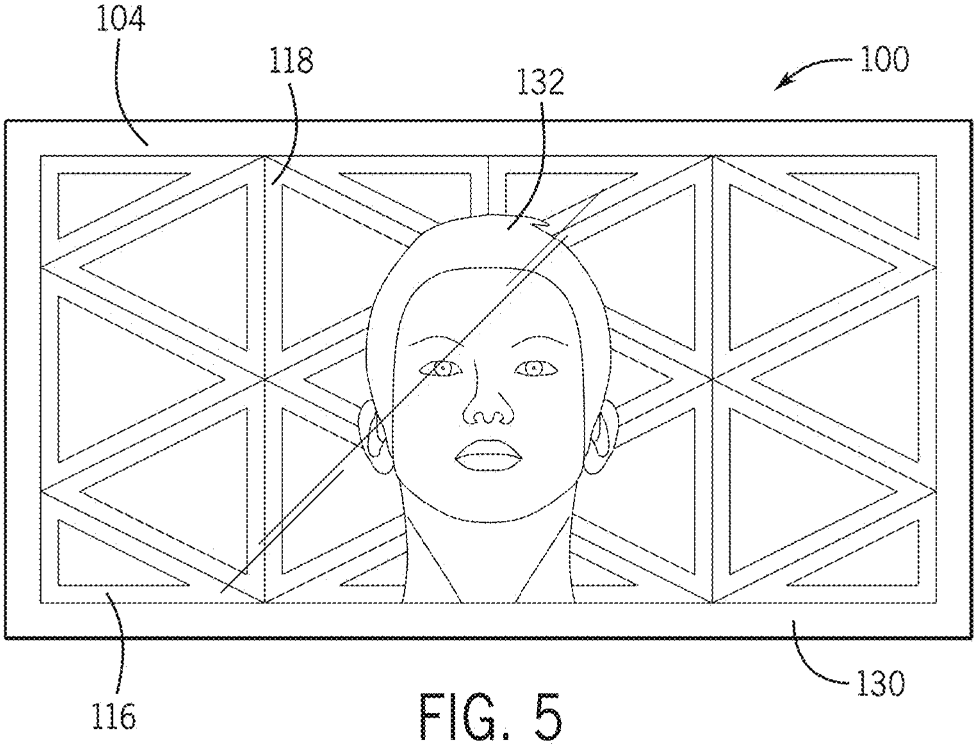
FIG. 5 illustrates a guest POV of an image generated by an example image system in a second configuration.

FIG. 5 illustrates a guest POV of an image generated by the system 100 in a second configuration. In FIG. 5, the second configuration may include the display 104, the graphic layer 116, and the second polarizer 130. For example, the second polarizer 130 may be positioned within the guest POV, such as in front of the display 104 and graphic layer 116 (e.g., when donning glasses 140, etc.). In such configurations, the second image 132 may be viewable by a guest. For instance, only guests donning glasses 140 may see the second image 132. In this manner, the second image 132 may be a selectively viewable hidden video or image. In examples, the second polarizer 130 may allow both the first image 118 and the second image 132 to be viewable by the user. For example, the first image 118 may appear as a background to the second image 132. In other examples, the second polarizer 130 may hide the first image 118, allowing only the second image 132 to be viewable.

The system 100 may be used to implement a method or process of creating a selectively invisible image or video. For example, light may be generated by the display 104. The generated light may pass through the first polarizer 108 to create polarized light having a polarization. The polarized light may then pass through the substrate 110, the substrate 110 maintaining the polarization of the light.

After passing through the substrate 110, the polarized may pass through the graphic layer 116. The graphic layer 116 may include perforations 124 or other openings that allow light pass-through without diffusing the polarized light. The graphic layer 116 may have or form the first image 118, which may be backlit by the display 104. In examples, the substrate 110 may enhance the first image 118, such as including various properties to highlight or otherwise improve visualization of the first image 118. The first image 118 may be viewable, such as at all times, by a guest.

Using second polarizer 130, the second image 132 may be viewable by the guest. For example, the guest may don glasses 140 or otherwise place the second polarizer 130 in their field of view. Once the second polarizer 130 is placed in the guest's field of view, the second image 132 may appear to the guest. When the second polarizer 130 is removed from the guest's field of view, the second image 132 may disappear or be otherwise invisible to the guest.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system comprising:

a first polarizer configured to create polarized light having a polarization;

a substrate configured to maintain the polarization and allow a first pass-through of the polarized light;

a graphic layer configured to maintain the polarization and allow a second pass-through of the polarized light, the graphic layer comprising a first image; and a second polarizer separate from the substrate and the graphic layer, the second polarizer configured to enable a visualization of a second image from the polarized light, wherein the second image is different than the first image.

2. The system of claim 1, wherein the graphic layer is placed on the substrate.

3. The system of claim 1, wherein openings are defined in the first image to allow the second pass-through of the polarized light.

4. The system of claim 3, wherein the graphic layer comprises perforations that define the openings of the first image.

5. The system of claim 1, further comprising a display, wherein the display comprises the first polarizer and the substrate.

6. The system of claim 5, wherein the display backlights the graphic layer to highlight the first image.

7. A system comprising:

a display comprising:

a first polarizer configured to create polarized light having a polarization; and a substrate configured to maintain the polarization and allow a first pass-through of the polarized light;

a graphic layer comprising perforations to allow a second pass-through of the polarized light, the graphic layer comprising a first image; and a second polarizer separate from the substrate and the graphic layer, the second polarizer configured to enable a visualization of a second image from the polarized light.

8. The system of claim 7, wherein the graphic layer is configured to maintain the polarization.

9. The system of claim 7, wherein the graphic layer is a graphic on the display.

10. The system of claim 7, wherein the display is a liquid crystal display.

11. The system of claim 7, wherein the second image is a video.

12. The system of claim 7, wherein the first image is a static image, and wherein the second image is a dynamic image.

13. A system comprising:

a display comprising:

a first polarizer configured to create polarized light having a polarization, and a substrate configured to maintain the polarization and allow a first pass-through of the polarized light;

a graphic layer on the substrate and comprising a first image, the graphic layer configured to maintain the polarization and further comprising perforations to allow a second pass-through of the polarized light; and a second polarizer separate from the display and the graphic layer, the second polarizer configured to enable a visualization of a second image from the polarized light.

14. The system of claim 13, wherein the graphic layer is a graphic adhered to the substrate on a front of the display.

15. The system of claim 13, wherein the second polarizer is matched to an orientation of the display to enable the visualization of the second image.

16. The system of claim 13, wherein the substrate is annealed glass or cast acrylic.

17. The system of claim 13, wherein the graphic layer is opaque to obfuscate the display.

18. The system of claim 13, wherein at least 40 percent of the graphic layer comprises perforations.

* * * * *